(12) United States Patent
Mittler et al.

(10) Patent No.: US 9,174,276 B2
(45) Date of Patent: Nov. 3, 2015

(54) METHOD OF PRODUCING A PISTON RING HAVING EMBEDDED PARTICLES

(75) Inventors: Richard Mittler, Leichlingen (DE); Laszlo Pelsoeczy, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 389 days.

(21) Appl. No.: 13/879,472

(22) PCT Filed: Jul. 19, 2011

(86) PCT No.: PCT/EP2011/062351
§ 371 (c)(1), (2), (4) Date: Apr. 15, 2013

(87) PCT Pub. No.: WO2012/048919
PCT Pub. Date: Apr. 19, 2012

(65) Prior Publication Data
US 2013/0193648 A1 Aug. 1, 2013

(30) Foreign Application Priority Data
Oct. 13, 2010 (DE) .......................... 10 2010 042 402

(51) Int. Cl.
| | | |
|---|---|---|
| *B22D 25/06* | (2006.01) | |
| *B22D 13/04* | (2006.01) | |
| *B22D 19/02* | (2006.01) | |
| *B22D 19/14* | (2006.01) | |
| *B22F 5/02* | (2006.01) | |
| *C21D 1/18* | (2006.01) | |
| *C21D 1/25* | (2006.01) | |
| *C21D 9/40* | (2006.01) | |
| *C22C 1/02* | (2006.01) | |
| *C22C 1/10* | (2006.01) | |
| *C22C 37/06* | (2006.01) | |
| *C22C 37/10* | (2006.01) | |
| *F16J 9/26* | (2006.01) | |
| *C22C 37/08* | (2006.01) | |

(52) U.S. Cl.
CPC .............. *B22D 25/06* (2013.01); *B22D 13/04* (2013.01); *B22D 19/02* (2013.01); *B22D 19/14* (2013.01); *B22F 5/02* (2013.01); *C21D 1/18* (2013.01); *C21D 1/25* (2013.01); *C21D 9/40* (2013.01); *C22C 1/02* (2013.01); *C22C 1/1036* (2013.01); *C22C 37/06* (2013.01); *C22C 37/08* (2013.01); *C22C 37/10* (2013.01); *F16J 9/26* (2013.01)

(58) Field of Classification Search
CPC ........ C22C 37/08; C22C 37/10; C22C 37/06; C22C 1/02; C21D 9/40; C21D 1/25; C21D 1/18; C21C 1/1036; B22D 25/06; B22D 13/04; B22D 19/02; B22D 19/14; B22F 5/02; F16J 9/26; Y10T 29/4927; Y10T 29/49277
See application file for complete search history.

(56) References Cited

U.S. PATENT DOCUMENTS

| | | | |
|---|---|---|---|
| 2,681,260 A | 6/1954 | Kistler | |
| 5,154,433 A * | 10/1992 | Naruse ...................... | F16J 9/26 277/443 |
| 5,989,729 A * | 11/1999 | Takagi ................... | B22D 19/14 428/552 |
| 6,161,837 A * | 12/2000 | Shureb ................. | C23C 14/025 277/443 |
| 7,833,636 B2 * | 11/2010 | Araujo ..................... | C23C 8/28 428/323 |
| 7,891,669 B2 * | 2/2011 | Araujo ................ | C23C 14/0036 204/192.15 |
| 8,273,469 B2 * | 9/2012 | Hoppe ................ | C23C 14/0036 204/192.38 |
| 8,317,938 B2 * | 11/2012 | Pelsoeczy ............... | C22C 38/02 148/221 |
| 2001/0028948 A1 * | 10/2001 | Takehana ............... | B22D 18/02 428/293.1 |
| 2010/0031914 A1 * | 2/2010 | Fukumoto ............ | B22D 13/023 123/193.2 |
| 2011/0148047 A1 * | 6/2011 | Araujo ....................... | F16J 9/26 277/443 |

FOREIGN PATENT DOCUMENTS

| | | |
|---|---|---|
| DE | 69422954 T2 | 10/2000 |
| EP | 0335012 A1 | 10/1989 |
| EP | 0821073 A1 | 1/1998 |
| JP | 57 118849 A | 7/1982 |
| JP | 58 006768 A | 1/1983 |
| JP | 58 119455 A | 7/1983 |
| JP | 58 215260 A | 12/1983 |
| JP | 59 033065 A | 2/1984 |
| JP | 59 082153 A | 5/1984 |
| WO | WO 2010/097103 A1 | 9/2010 |
| WO | WO 2010/097107 A1 | 9/2010 |
| WO | WO 2010/108528 A1 | 9/2010 |

OTHER PUBLICATIONS

"Thin Film Evaporation Guide", Vacuum Engineering & Materials Co., Inc., 2008, XP002662416.
V.G. Asmolov et al, "Choice of Buffer Material for the Containment Trap for VVER-1000 Core Melt", Atomic Energy, Bd. 92, Nr. 1, Jan. 2002, pp. 5-14, XP002662408.

* cited by examiner

*Primary Examiner* — Jason L Vaughan
(74) *Attorney, Agent, or Firm* — Robert L. Stearns; Dickinson Wright, PLLC

(57) ABSTRACT

A piston ring exhibiting particles capable of wear resistance on its shoulder is produced by producing a melt of the base materials of a metal material, adding ceramic particles to the melt, pouring the melt into a prefabricated mold and cooling the melt. During cooling, the mold is aligned such that the ceramic particles gather on at least one of the piston ring shoulders.

5 Claims, No Drawings

METHOD OF PRODUCING A PISTON RING HAVING EMBEDDED PARTICLES

BACKGROUND OF THE INVENTION

1. Technical Field

The present invention relates to a method of producing a piston ring in which particles for the prevention of piston shoulder wear are embedded. The present invention further relates to a piston ring which has been produced using the method according to the invention.

2. Related Art

Piston rings in an internal combustion engine seal the gap existing between the piston head and the cylinder wall in relation to the combustion chamber. During the upward and downward movement of the piston, the piston ring on the one hand slides with its outer peripheral surface in constant resilient abutment with the cylinder wall, on the other hand the piston ring slides, due to the tilting movements of the piston, in an oscillating manner in its piston ring groove, wherein its shoulders alternately abut the upper or lower groove shoulder of the piston ring groove. Depending on the material used, a greater or lesser degree of wear occurs in the sliding partners running against one another in each case, said wear leading to fissures, scoring and ultimately to destruction of the engine in the case of dry running. In order to improve the sliding and wear performance of piston rings in relation to the cylinder wall, said rings were provided with coatings of different materials on their peripheral surface.

During dynamic engine running, piston rings are exposed to axial movement in the piston groove on account of gas, frictional and inertia forces. They are subject to continuous sliding wear due to their constant contact with the cylinder bore. This is manifested both as abrasive wear of the piston ring surface or its coating and also as the partial transfer of material from the cylinder running surface to the piston running surface and vice versa. This causes abrasive wear on the shoulders of the piston ring, which severely affects the functional performance of the piston ring. This shoulder wear has a direct effect on the engine's emission performance.

Cast iron materials or cast iron alloys are mainly used to produce piston rings. Piston rings, particularly compression rings, are subject to an increasing load in high-performance engines, including compression peak pressure, combustion temperature, EGR and lubricating film reduction, which have a crucial effect on the functional properties of said engines, such as wear, burn mark resistance, microwelding and corrosion-resistance. State-of-the-art cast iron materials exhibit a high fracture risk, however, which means that when the previous materials are used, ring fractures frequently occur. Increased mechanical-dynamic loads lead to shorter service lives among piston rings. There is also severe wear and corrosion on the running surface and the shoulder. Due to the greater mechanical and dynamic stresses on piston rings, ever more engine manufacturers are calling for piston rings and cylinder liners made from high-grade steel. In this case, ferrous materials with a carbon content below 2.08% by weight are referred to as steel. If the carbon content is higher, they are referred to as cast iron. Steel materials have better strength and toughness properties compared with cast iron, as there is no interference due to free graphite in the basic structure.

Today's piston ring materials based on cast iron or steel constitute a homogeneous material, which itself is insufficiently resistant to shoulder wear. In order to reduce shoulder wear in piston rings in engines, wear protection layers are applied to the piston ring shoulders. Piston rings with particle-reinforced hard-chrome coatings exhibit significantly improved abrasion resistance, for example, compared with uncoated or nitrated rings, but also compared with piston rings with conventional hard-chrome and plasma-injected layers on a molybdenum base. However, these coatings have also come close to the limits of their performance capability, due to the increasing pressure and temperature parameters in modern combustion engines. There was therefore a need for new coatings with even lower wear and greater adhesion resistance than had previously been the case. In order to satisfy this requirement, composite powders were applied to piston ring surfaces by means of thermal spraying, said powders containing a ceramic phase in a metal matrix. In this way, it is possible to combine the good tribological properties of ceramics with the good mechanical properties of metals. A tough, ductile fusion of the hard and in some cases brittle ceramic particles in the metallic matrix is guaranteed. The ceramic particles can then assume tribological functions with suitable exposure on the surface of the piston ring, while the metal matrix absorbs the mechanical loads and reduces stresses where required via deformations.

The production of piston rings coated in this manner is however costly, as a coating stage must be added on to the production of the piston ring. The problem addressed by the present invention is therefore that of creating a method of producing piston rings, which are provided with ceramic particles on their shoulders, without a coating step being required to introduce these ceramic particles.

SUMMARY OF THE INVENTION

This problem is solved according to the invention by a method of producing a piston ring which comprises the following steps:
 a. Production of a melt of the base materials of a metal material,
 b. Addition of ceramic particles to the melt, wherein the ceramic particles exhibit a density of <4.0 g/cm$^3$,
 c. Pouring of the melt into a prefabricated mould, wherein the mould only allows the casting of a ring, and
 d. Cooling of the melt, wherein a period ≥120 seconds elapses before the liquidus temperature is reached and wherein the mould is aligned horizontally, so that the ceramic particles gather on at least one of the piston ring shoulders during cooling.

The ceramic particles may, for example, be introduced into the metal melt by stirring.

DETAILED DESCRIPTION

In order to achieve the accumulation of ceramic particles on the desired shoulders, use is made of the fact that the ceramic particles and the metal melt display a different density. It is important here that the density of the ceramic particles is smaller than that of the metal melt. This means that the density of the ceramic particles should be <4.0 g/cm$^3$. What is preferable is a density of ceramic particles within a range of 1.0 to <4.0 g/cm$^3$, more preferably a density of ceramic particles within a range of 1.8 to <3.0 g/cm$^3$, more preferably a density of ceramic particles within a range of 2.1 to <2.8 g/cm$^3$. A density of ceramic particles within a range of 2.1 to <2.6 g/cm$^3$ is ideally suited. The density of the ceramic particles may be influenced or adjusted via the production process in a manner known to the person skilled in the art.

In addition, the mould should only allow a ring to be cast. As a result of the individual casting method, the material solidifies from the outside in during cooling of the rings.

In order to ensure that the ceramic particles accumulate on the desired shoulders, the mould should be disposed horizontally, in order to facilitate a separation by means of gravitational force. A partial separation of the metal casting material from the ceramic particles may alternatively be accelerated through the use of a centrifuge, wherein the perpendicular of the plane, which is defined by the casting mould, lies in the centrifuge plane. In other words, the mould is parallel to the axis of rotation of the centrifuge, so that the ceramic particles gather in the direction of the axis of rotation. It has been found that an advantageous distribution of ceramic particles in the metal casting material can be achieved above all through separation by means of gravitational force.

In order to ensure an adequate accumulation of ceramic particles by means of gravitational force, a period ≥120 seconds should elapse before the liquidus temperature is reached. The period before the liquidus temperature is reached is preferably ≥180 seconds, more preferably between 180 and 300 seconds. Most preferable is a period of between 180 and 210 seconds.

In order to maintain the desired cooling velocity, heat may be fed in from outside, for example. This may therefore involve a heatable mould. Alternatively, exothermic additives may be added to the melt. A further possibility involves selecting a particular volume-to-surface ratio of the piston ring blank of V/O=>0.5 cm.

The ceramic particles are preferably selected from the group comprising particles of $Al_2O_3$, $Cr_2O_3$, $Fe_3O_4$, $TiO_2$, $ZrO_2$ and mixtures thereof.

In order, on the one hand, to make it easier for the ceramic particles to accumulate on the desired piston ring shoulder and, on the other hand, to guarantee good tribological properties for the piston ring, the mean diameter of the ceramic particles is chosen depending on the cross-section of the piston ring. The ceramic particles may exhibit a mean diameter within the range 0.1 to 100 μm. The ceramic particles preferably exhibit a mean diameter within the range 0.5 to 80 μm, more preferable is a mean diameter within the range 0.5 to 40 μm, more preferable is a mean diameter within the range 1.0 to 25 μm, more preferable is a mean diameter within the range 5.0 to 25 μm. Most preferable is a mean diameter within the range 5.0 to 15 μm.

The metal casting material is preferably cast iron or a cast steel material, such as V4 steel. Suitable materials for piston rings and also the production thereof, examples being steel presses, are known to the person skilled in the art.

If the metal casting material is cast iron, this preferably contains the following elements in the proportion indicated relative to 100% by weight of the cast iron composition: C, 2.0-3.8% by wt; Si and/or Al, 1.0-4.0% by wt; Mn, 0.05-1.5% by wt; P, 0-0.7% by wt; S, 0-0.1% by wt; Cr, 0.05-1.5% by wt; Cu, 0.05-2.5% by wt; Sn, 0-2.5% by wt; N, 0-0.08% by wt, remainder Fe.

If the metal casting material is a steel material, this preferably contains the following elements in the proportion indicated relative to 100% by weight of the steel material composition: C, 2.00-4.00% by wt; Si, up to 0.10% by wt; P, up to 0.10% by wt; S, up to 0.20% by wt; Mn, up to 1.30% by wt; Cu, up to 0.50% by wt; Cr, 1.7 to 5.00% by wt; Ni and lanthanides, 0.10-2.00% by wt; Mo, 0.1% to 2.0% by wt; Co, up to 0.20% by wt and at least one element selected from the group comprising Ti, V and Nb totalling up to 1.5% by wt, remainder Fe.

Where appropriate, the piston ring may be tempered as follows. This takes place by means of the following steps:
- e. Austenitization of the piston ring above its Ac3 temperature,
- f. Quenching of the piston ring in a suitable quenching medium and
- g. Relieving of the piston ring at a temperature within the range 400 to 700° C. in a controlled atmosphere furnace.

Oil is preferably used as the quenching medium.

In addition, an abrasion-resistant coating made of a material known to the person skilled in the art may be present on the ring running surface and/or the ring shoulder of the piston ring. A layer of this kind may be applied through a series of processes known in the state of the art. The layer may therefore be applied by a thermal coating process such as plasma spraying, wire arc spraying, cold gas spraying, wire flame spraying and HVOF coating, for example. Alternatively, the layer may be deposited by means of galvanisation, PVD, CVD, painting and nitration. Equally, combinations of the processes may also be used.

The invention claimed is:

1. A method of producing a piston ring comprising:
   a. producing a melt of the base materials of a cast iron or cast steel material,
   b. adding ceramic particles to the melt, wherein the ceramic particles exhibit a smaller density than the melt;
   c. pouring the melt into a prefabricated mold, wherein the mold only allows the casting of a ring, and
   d. cooling the melt, wherein a cooling rate is maintained, so that a period ≥120 seconds elapses before the liquidus temperature is reached and wherein the mold is aligned horizontally, in order to facilitate a separation by means of gravitational force, so that the ceramic particles gather on at least one of the piston ring shoulders during cooling.

2. The method according to claim 1, wherein the ceramic particles are selected to exhibit a density <4.0 g/cm³.

3. The method according to claim 1, wherein the ceramic particles are selected from the group comprising particles of $Al_2O_3$, $Cr_2O_3$, $Fe_3O_4$, $TiO_2$, $ZrO_2$ and mixtures thereof.

4. The method according to claim 1, wherein the ceramic particles are selected to exhibit a mean diameter of 0.1 to 100 μm.

5. The method according to claim 1, including:
   e. austenitizing the piston ring above its Ac3 temperature,
   f. quenching the piston ring in a quenching medium and
   g. relieving the piston ring at a temperature within the range 400 to 700° C. in a controlled atmosphere furnace.

* * * * *